Nov. 10, 1970 G. KRAUSE 3,539,714
METHOD AND APPARATUS FOR THE REGENERATION OF THE COLOR BURST IN A CODED COLOR TV SIGNAL
Filed July 23, 1968
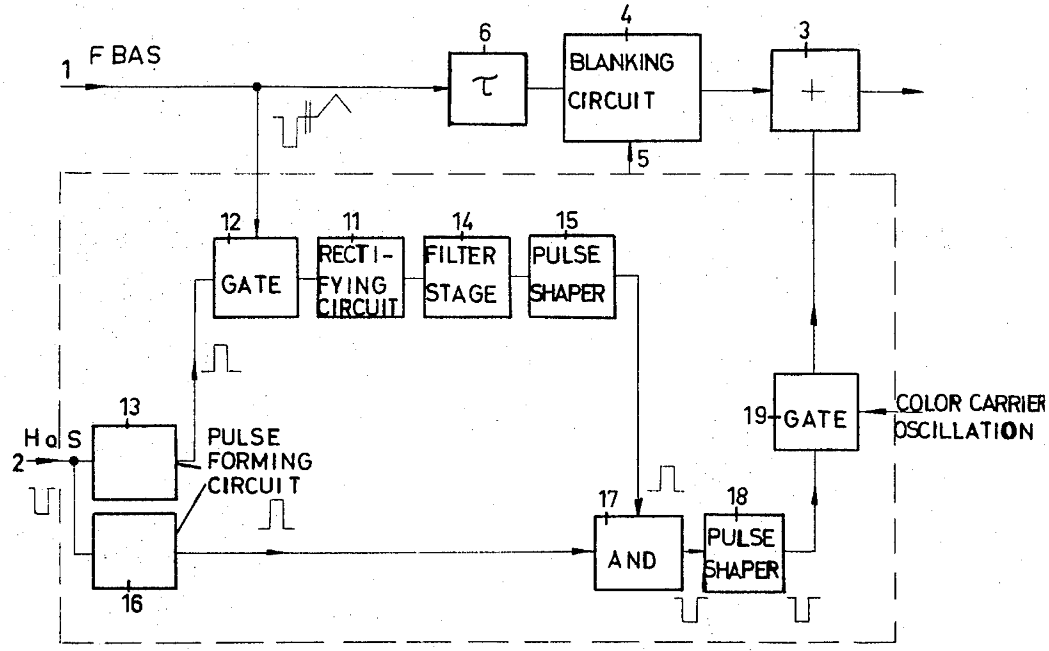
Inventor:
Gerhard Krause
by
[signature]
His Attorney.

United States Patent Office 3,539,714
Patented Nov. 10, 1970

3,539,714

METHOD AND APPARATUS FOR THE REGENERATION OF THE COLOR BURST IN A CODED COLOR TV SIGNAL

Gerhard Krause, Darmstadt, Germany, assignor to Fernseh G.m.b.H., Darmstadt, Germany, a corporation of Germany Filed July 23, 1968, Ser. No. 746,842
Claims priority, application Germany, July 27, 1967, 1,537,110
Int. Cl. G04n 9/46
U.S. Cl. 178—5.4 10 Claims

ABSTRACT OF THE DISCLOSURE

A method and apparatus for regenerating the color burst into a color TV signal at the receiver are disclosed. A first pulse corresponding to the presence of a color burst is produced. A second pulse is derived from the sweep synchronizing signal. If both pulses are present at the same time, a color carrier oscillation produced by a color carrier generator is gated into the color TV signal as a new color burst.

The present invention relates generally to an apparatus and method for the regeneration of the color burst into a color TV signal and, more particularly it relates to an apparatus and method for the regeneration of the color burst into a color TV signal coded preferably according to the PAL system.

At present it is necessary that a new color burst or color synchronizing signal be added to a color TV signal which has been transmitted through a transmission path or through a storage device. The phase of such new color burst should at the same time correspond to the phase of the original color burst.

According to a known method of color burst regeneration, a quartz oscillator produces a continuous color carrier frequency, the phase of which is compared with the phase of the color burst in the color TV signal. Then with the help of an error signal, which is a function of the phase difference, the phase of the color carrier frequency produced by the quartz oscillator is corrected so that the phase difference becomes zero. The color burst is removed from the color carrier frequency by means of a gating circuit and will be added to the original color TV signal after the original color burst has been removed therefrom by means of a blanking circuit.

With the color TV signals coded according to the PAL system in which, in accordance with present standards, the phase of the color bursts in successive line periods is shifted by 90°, the color burst is not transmitted during the vertical blanking intervals. In order that the transient effects of the color voltage for the color oscillator resulting from the interruption of the color burst train during the vertical blanking intervals, could be similarly distributed for each partial image or frame, according to the presently proposed standards, the blanking of the color bursts during the vertical blanking periods in each four successive partial image or frame, which as to the three synchronizing signals for the vertical, horizontal and color carrier synchronization are not identical, is shifted in time with respect to each other so that in each partial image or frame the series of the color bursts begins with a burst of similar phase. The offtake of the time-wise shifted gating pulses for the newly added color burst produced in accordance with the above-described method requires considerably extensive apparatus.

It is, therefore, an object of the present invention to provide a new method for the regeneration of the color burst into a color TV signal.

It is another object of the present invention to provide an apparatus for carrying out the above method of regeneration of the color burst into a color TV signal.

According to the present invention method is provided for the regeneration of the color burst into a color TV signal coded preferably according to the PAL system, in which the color burst is blanked from the color TV signal and, into such color TV signal a new color burst is added which is produced from a continuous color carrier oscillation synchronize by the color burst of the color TV signal and, in which the color burst removed from the color TV signal is rectified and a pulse corresponding to the mean value of the rectified signal is compared in time with a pulse derived from the synchronizing signal of the color TV signal and, if both pulses are present at the same time, a color carrier oscillation produced by a color carrier generator is gated into the color TV signal as a new color burst.

According to the method of this invention, it is possible to determine whether a color burst is present in the line interval of the color TV signal and a new color burst will be added only during those line intervals in which a color burst was present also in the original color TV signal.

The apparatus for carrying out the method of the present invention comprises an appaartus for the regeneration of the color burst into a color television signal from which the color burst has been removed and into which a new color burst should be reintroduced, comprising input means for receiving said color television signal, means connected to said input means for deriving a first set of pulses from the color burst of said color television signal, coincidence circuit means connected to receive said first set of pulses, means deriving a second set of pulses from the synchronizing signal of said color television signal, means connecting said deriving means to said coincidence circuit means for feeding said second set of pulses thereto, said coincidence circuit means being adopted to pass a pulse therethrough only when a pulse in said first set of pulses coincides time-wise with a pulse in said second set of pulses, gate means connected to said coincidence circuit means, a source of oscillating signals connected to said gate means for releasing a signal corresponding to the original color burst only when said gate means is open upon receiving a signal from said coincidence circuit means, and means adding said burst signal from said source to said color television signal from which said color burst has ben previously removed.

The invention will become more readily apparent from the following description of a preferred method and embodiment thereof described with reference to, and shown, by way of example, in the accompanying drawing, in which:

The single view shows a circuit diagram illustrating the color burst regeneration circuit of a color TV set in a schematic fashion.

With reference to the drawing, the color TV signal into which the color burst will be regenerated, is received at input 1. A gate circuit 12 connects input 1 with a rectifier circuit 11 only during the time period when the color burst is present in the color TV signal since gate circuit 12 is actuated or gated by a pulse which is formed by a pulse forming circuit 13 from a signal in synchron with the color burst and separated from the color TV signal in a known manner and, fed into pulse former 13 from an input 2. The color burst passed by gate 12 is first rectified in the rectifying circuit 11.

The rectified voltage from the rectifying circuit 11, enters a filter stage 14 in which a mean value is formed therefrom and, at the same time, the rectified voltage is freed therein from noise and short interference spikes carried therewith. As a rule, the filtering can be sufficiently performed by a usual storage condenser connected after rectifier circuit 11. If it becomes necessary, the smoothed pulse leaving filter stage 14 may be introduced into a further pulse shaping circuit 15 to improve its shape.

From the synchronizing signal entering the circuit at input 2, a pulse is formed in a pulse forming circuit 16 for the purpose of gating or keying in the new color burst signals. This pulse and the pulse derived from the rectified color burst are fed into a coincidence circuit 17 (this is in the form of a logic circuit "AND"). The coincidence circuit 17 supplies then a keying signal in the event should pulses be present at its inputs at the same time. According to the circuit of the present invention, the color burst will not be added to the color TV signal during the vertical blanking intervals since during such intervals no pulse can be derived from the rectified color burst since there is just no pulse present in it at this time.

Should the need arise, the output pulse of the coincidence circuit 17 may be fed into a further pulse shaping circuit 18 for further shaping. A gate circuit 19 is provided at the output of pulse shaping circuit 18 which gate circuit 19 performs the keying on of the new color burst. For this purpose, gating circuit 19 receives a continuous color carrier oscillation from a color carrier generator (not shown in the drawing) which is synchronized by the color burst of the original color TV signal. Such color carrier frequency is passed to an adding stage 3 only if an output signal is present at the output of the coincidence circuit 17.

In adding stage 3 the new color burst is added to the color TV signal after the original color burst has been removed from the color TV signal in a blanking circuit 4 in a known manner. The blanking circuit 4 to this effect receives at its input 5 a continuous train of blanking pulses which were derived from the synchronizing signal of the color TV signal.

In order to equalize or compensate for the signal transition time, delay circuits such as delay circuit 6 may be inserted into the path of the color TV signal, so that the added color burst appears in its predetermined position, namely, on the black trailing pedestal of the color TV signal.

While the present invention has been described with reference to a preferred method and embodiment thereof, it will be understood that numerous modifications may be made by those skilled in the art without actually departing from the scope of the invention. Therefore, the appended claims are intended to cover all such equivalent variations as come within the true spirit and scope of the invention.

Having thus described the invention, what I claim as new and desire to be secured by Letters Patent is as follows:

1. A method for the regeneration of the color burst into a color television signal from which the color burst has been removed and into which a new color burst should be reintroduced comprising the steps of forming first pulses from said removed color burst, deriving second pulses from the synchronizing signal of said color television signal, producing a continuous color carrier oscillation as the source for said new color burst, adding said color carrier oscillation as the new burst to said blanked color television signal only when said first and second pulses time-wise coincide.

2. The method as claimed in claim 1, wherein said color burst is rectified prior to the forming of said first pulses, said first pulses formed from said rectified burst correspond to the mean value of said rectified burst.

3. The method as claimed in claim 1, wherein said color television signal is coded in the PAL system.

4. The method as claimed in claim 1, wherein said color carrier oscillation is synchronized with the color burst of the color television signal.

5. Apparatus for the regeneration of the color burst into a color television signal from which the color burst has been removed and into which a new color burst should be reintroduced, comprising input means for receiving said color television signal, means connected to said input means for deriving a first set of pulses from the color burst of said color television signal, coincidence circuit means connected to receive said first set of pulses, means deriving a second set of pulses from the synchronizing signal of said color television signal; means connecting said deriving means to said coincidence circuit means for feeding said second set of pulses thereto, said coincidence circuit means being adapted to pass a pulse therethrough only when a pulse in said first set of pulses coincides time-wise with a pulse in said second set of pulses, gate means connected to said coincidence circuit means, a source of oscillating signals connected to said gate means for releasing a signal corresponding to the original color burst only when said gate means is open upon receiving a signal from said coincidence circuit means, and means adding said burst signal from said source to said color television signal from which said color burst has been previously removed.

6. The apparatus as claimed in claim 5, wherein said first pulse deriving means comprise rectifying means for forming unidirectional signals from said color burst.

7. The apparatus as claimed in claim 6, wherein said first pulse deriving means comprise a filter means connected to said rectifying means for producing a mean value from said rectified color burst.

8. The apparatus as claimed in claim 7, wherein said first pulse deriving means comprise pulse forming means connected to said filter means.

9. The apparatus as claimed in claim 5, wherein a further gate means connects said first pulse deriving means to said input means.

10. The apparatus as claimed in claim 5, including a second input means for receiving said synchronizing signal of said color television signal, a second pulse forming means connecting said further gate means to said second input means for passing said color burst to said first pulse deriving means only when a pulse is present in said second pulse producing means.

References Cited

UNITED STATES PATENTS

| | | | |
|---|---|---|---|
| 2,930,842 | 3/1960 | Leyton | 178—5.4 |
| 3,024,305 | 3/1962 | Wolfe | 178—69.5 |
| 3,435,132 | 3/1969 | Palladino | 178—5.4 |

RICHARD MURRAY, Primary Examiner

J. C. MARTIN, Assistant Examiner